Patented Feb. 21, 1928.

1,659,793

UNITED STATES PATENT OFFICE.

ELMER B. VLIET, OF CHICAGO, ILLINOIS, ASSIGNOR TO ABBOTT LABORATORIES, OF NORTH CHICAGO, ILLINOIS, A CORPORATION OF ILLINOIS.

DIALLYLCYANAMIDE.

No Drawing.    Application filed April 12, 1926.   Serial No. 101,530.

My invention relates to the synthesis of the diallyl derivative of cyanamide, a compound possessing the structure,

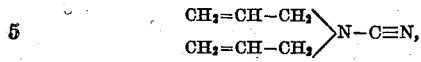

and which is capable of being readily hydrolyzed by acids or alkalies to yield diallylamine.

The starting materials used in this synthesis are an allyl halide and a salt of cyanamide, preferably an alkali metal salt, such as di-sodium cyanamide. The reaction may be conducted in a solvent composed of water and a miscible organic solvent, such as alcohol, whose proportions may be varied within wide limits. Di-sodium cyanamide may be used either as such, or it may be formed in solution by the action of sodium hydroxide on cyanamide, $H_2CN_2$, or by adding sodium hydroxide solution to a solution of calcium cyanamide, obtained by extracting commercial "lime nitrogen" with water. The reaction is carried out at a somewhat elevated temperature, although it does take place even at room temperature but more slowly.

In place of the alkali metal salt of cyanamide, an alkaline-earth salt, such as the calcium salt, may be used, although the reaction does not give as good yields.

If an insoluble salt of cyanamide, such as the silver salt, is used as the starting material, it may be allowed to react with the allyl halide either in the presence of an organic solvent, or without any solvent. After the reaction has been completed by heating the mixture, the product is filtered and the filtrate distilled to obtain the pure diallylcyanamide.

Examples:

1. 200 grams of "lime nitrogen" is slowly added to 666 cc. of cold water and 133 grams of cracked ice. After stirring for ten minutes, a cold solution of 111 grams of sodium hydroxide in 200 cc. of water is added and stirring is continued for an hour. 382 grams of allyl bromide and 666 cc. of 95% alcohol are then added and the mixture is heated with stirring on a water bath for two and one-half hours so that there is slight refluxing. 500 cc. of liquid is then distilled off and the residue is cooled and filtered.

The filtrate, which is in two layers, is extracted with benzene to remove all of the diallylcyanamide. The benzene is distilled off, leaving the diallylcyanamide as a liquid. This may be purified by distillation under reduced pressure and is thus obtained as a colorless liquid boiling at 105–110° C. under 18 mm. pressure or 140–145° C. under 90 mm. It is relatively insoluble in water but soluble in alcohol, benzene and other common organic solvents.

2. 210 grams of allyl bromide and 585 cc. of benzene are added to 175 grams of powdered di-silver cyanamide and the mixture is refluxed gently on a water bath for four hours. The reaction mixture is then cooled and filtered. Benzene is distilled from the filtrate leaving the diallylcyanamide as a residue which may be purified, as described in Example 1, by distillation under reduced pressure.

This material is useful in the preparation of diallylamine, which in turn is an intermediate employed in the production of certain synthetic medicinal substances, for example anesthetics.

I claim as my invention:

1. As a new article of manufacture, the diallyl derivative of cyanamide, possessing the structure,

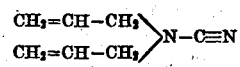

which is a colorless liquid boiling at 105–110° C. under 18 mm. pressure and at 140–145° C. under 90 mm. pressure and which is capable of being readily hydrolyzed by acids or alkalies to yield diallylamine.

2. The method of producing diallylcyanamide, which consists in allowing to react, in a suitable solvent, a salt of cyanamide with an allyl halide, and isolating and purifying the product so obtained.

3. The method of producing diallylcyanamide, which consists in allowing to react, in a mixture of water and alcohol, the di-sodium salt of cyanamide with an allyl halide, and isolating and purifying the material so obtained.

4. The method of producing diallylcyanamide, which consists in allowing to react, in a mixture of water and alcohol, the di-sodium salt of cyanamide with allyl bromide, and isolating and purifying the material so obtained.

Date April 2, 1926.

ELMER B. VLIET.